United States Patent [19]

Eisenlohr et al.

[11] 4,060,595
[45] Nov. 29, 1977

[54] PROCESS FOR RECOVERING ELEMENTAL SULFUR FROM GASES HAVING A HIGH CARBON DIOXIDE CONTENT AND CONTAINING SULFUR COMPOUNDS

[75] Inventors: Karl-Heinz Eisenlohr, Buchschlag; Karl Bratzler, Bad Homburg, both of Germany

[73] Assignee: Metallgesellschaft Aktiengesellschaft, Frankfurt am Main, Germany

[21] Appl. No.: 705,115

[22] Filed: July 14, 1976

[30] Foreign Application Priority Data

July 17, 1975 Germany .............................. 2531930

[51] Int. Cl.$^2$ .............................................. C01B 17/04
[52] U.S. Cl. .................................. 423/574 R; 423/570
[58] Field of Search ............... 423/541, 542, 570, 574, 423/244

[56] References Cited

U.S. PATENT DOCUMENTS

| | | | |
|---|---|---|---|
| 3,764,665 | 10/1973 | Groenendaal | 423/574 |
| 3,794,710 | 2/1974 | Merrill | 423/542 Y |
| 3,822,337 | 7/1974 | Wunderlich et al. | 423/574 |
| 3,896,215 | 7/1975 | Bratzler et al. | 423/574 |
| 3,970,744 | 7/1971 | Riesenfeld | 423/574 |

FOREIGN PATENT DOCUMENTS 1,163,786  2/1964  Germany.

OTHER PUBLICATIONS

Bryant, H.S. "OIL & Gas Journal"; 3-26-73; pp. 70-75.

*Primary Examiner*—G. O. Peters
*Attorney, Agent, or Firm*—Karl F. Ross

[57] ABSTRACT

A process for recovering elemental sulfur from gases containing inorganic and/or organic sulfur compounds together with large quantities of carbon dioxide and other possible impurities such as unsaturated hydrocarbon and hydrogen cyanide. The waste gas is combined with a combustion-promoting gas and the resulting mixture is burned with a slight excess of air and caused to contact coke at a temperature of 300° to 450° C. The resulting gas, from which oxygen, sulfur trioxide and nitrogen oxide have been removed, by contact with the coke, is cooled to 20° to 80° C and then is scrubbed with aqueous alkali salts of weak inorganic and/or organic acids or amines to remove $SO_2$. The absorbent is stripped and the recovered $SO_2$ is reacted with hydrogen at 200° to 400° C to form sulfur and/or hydrogen sulfide and, when hydrogen sulfide is produced, the latter is reacted on alumina or activated carbon at 200° to 300° C to produce the elemental sulfur. All or part of the gas after recovery of the elemental sulfur is recycled.

6 Claims, 1 Drawing Figure

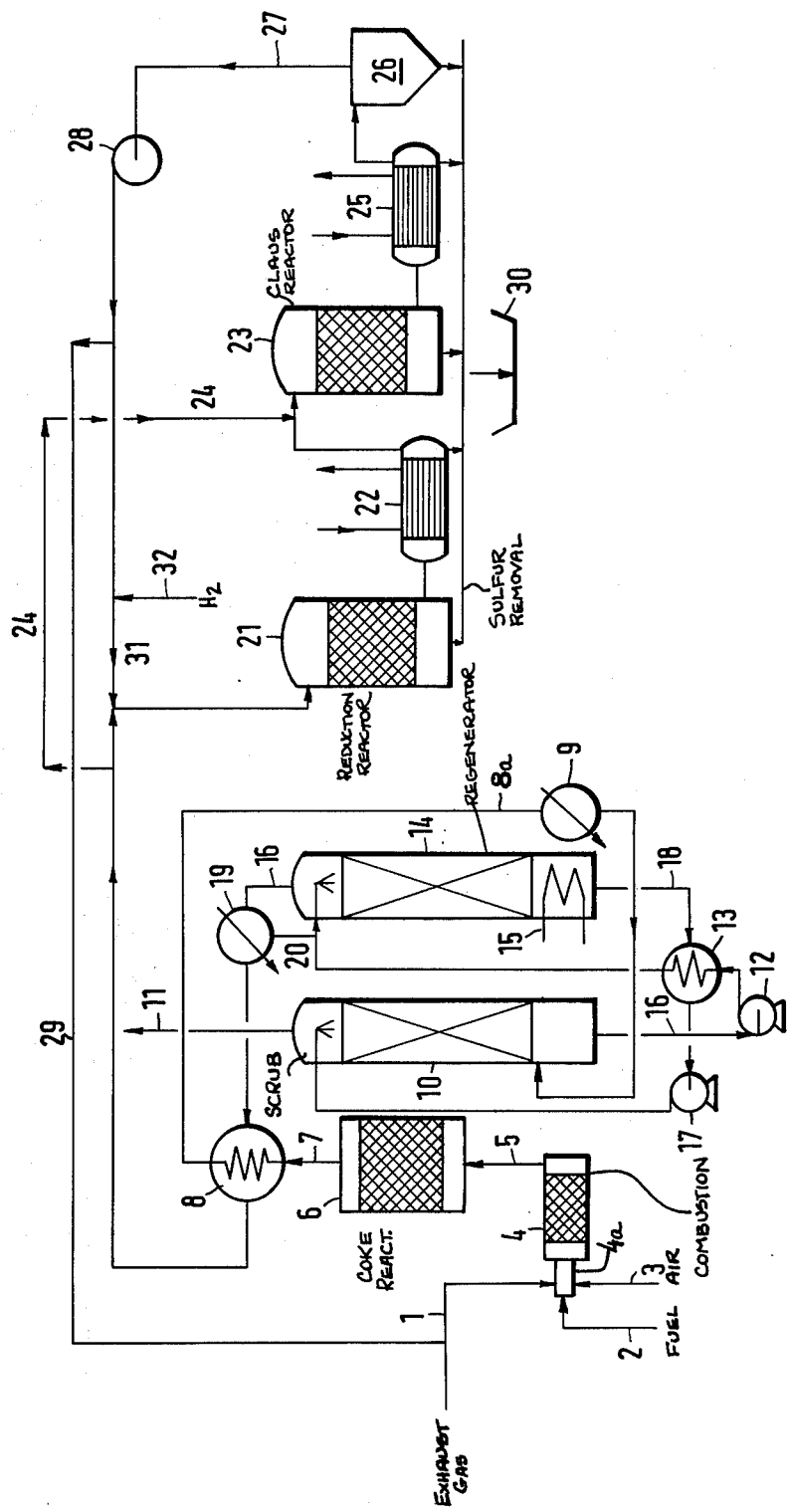

PROCESS FOR RECOVERING ELEMENTAL SULFUR FROM GASES HAVING A HIGH CARBON DIOXIDE CONTENT AND CONTAINING SULFUR COMPOUNDS

FIELD OF THE INVENTION

This invention relates to a process for recovering elemental sulfur from gases which have a high carbon dioxide content and contain inorganic and/or organic sulfur compounds, unsaturated hydrocarbons, hydrogen cyanide and other impurities.

BACKGROUND OF THE INVENTION

When fossil fuels are gasified to produce fuel gases and synthesis gases, the resulting gases have a high $CO_2$ content and in addition thereto contain $H_2S$ and organic sulfur compounds and other impurities, such as HCN. When produced from coal, such gases usually also contain unsaturated hydrocarbon which tend to polymerize and are referred to as resinogetic substances, and $NH_3$.

These gases are mostly produced under pressure and are almost always scrubbed to remove the above-mentioned impurities. It has become conventional in gas-purification technology to scrub the gases with physically absorbing scrubbing agents.

Such a process, in which organic liquids, such as methanol, are used as scrubbing agents, has been described, e.g. in German Pat. No. 935,144.

It is also known to remove impurities from gases by chemical scrubbing.

German Pat. No. 1,145,740, for example, describes a process of scrubbing gases with water under pressure to remove $H_2O$ and $CO_2$ from said gases. An ethanolamine, preferably triethanolamine, and a polybasic material acid in which the terminal hydrogen atom has no longer an acid activity, such as phosphoric acid, are added to the aqueous scrubbing liquor in a very small amount, which totals about 0.02–0.2 moles and in which is so selected that the pH value of the scrubbing liquor is slightly below or not in excess of 8.

In another known process, a mixture of organic liquids, such as methanol, with water and amines is used to scrub the gases (Opened German specification — Offenlegungsschrift — No. 1,815,1137).

In physical scrubbing processes it is easy to remove the above-mentioned impurities but the regeneration of the scrubbing agent laden with said impurities results in exhaust gases which can be eliminated or destroyed only at high expense and in a difficult manner particularly in view of ecological requirements. Whereas these impurities, which are generally combustible, in the regeneration exhaust gases having in most cases a high $CO_2$ content can be burnt, this results in combustion gases which have such a high $SO_2$ content that the problem is not solved by the combustion alone.

The removal of impurities such as HCN, polymerizable hydrocarbons, mercaptans, and $NH_3$ from gases by chemical scrubbing requires a high expenditure and involves considerable difficulty. Specifically, it is very difficult to regenerate the scrubbing liquor and to recover the chemicals.

OBJECT OF THE INVENTION

It is the object of this invention to avoid these diadvantages of the known processes and provide a process which is economically and ecologically satisfactory.

SUMMARY OF THE INVENTION

In accordance with the invention the process for recovering elemental sulfur from gases which have a high carbon dioxide content and contain inorganic and/or organic sulfur compounds, unsaturated hydrocarbons, hydrogen cyanide, and other impurities comprises adding a combustion-promoting gas to the gases, the resulting mixture being burned with a slight excess of air.

The resulting gas is caused to flow in contact with with coke at temperatures of 300°–450° C to remove residual oxygen, sulfur trioxide, and nitrogen oxides.

The prepurified gas is cooled to a temperature of 20°–80° C and is then subjected in one or two stages to counterflow scrubbing with an aqueous absorbent solution of alkali salts of weak inorganic and/or organic acids or amines to remove sulfur dioxide, the laden solution is heated and stripped with gases or water vapor to strip off the sulfur diodide.

The stripped-off sulfur dioxide is cooled, excess hydrogen is added thereto, and the mixture is hydrogenated at temperatures of 200°–450° on a catalyst which contains oxides of cobalt, of nickel, of molybdebum or of tungsten, to form sulfur and/or hydrogen sulfide, the resulting elemental sulfur is removed by cooling.

Sulfur dioxide in a stoichiometric proportion is added, if required, to hydrogen sulfide which has been formed, the mixture is reacted at temperatures of 200°–300° C in contact with a catalyst consisting of alumina or activated carbon to form elemental sulfur, which is recovered by cooling, and all or part of the resulting exhaust gas is recycled to the process.

The process according to the invention comprises the burning of the combustible constituents of the exhaust gases which have been released by the regeneration of the laden absorbent solution and have a high $CO_2$ content. The combustion may be effected in contact with a catalyst or as a strictly thermal process. In both cases, a combustion-promoting gas having a high calorific value is required to increase the calorific value of the gas, this calorific value must be kept above a lower limit to ensure that the combustion is upheld. This combustion-promoting gas may be a common fuel gas (e.g. methane) or a fraction which has a high calorific value. Such fraction is released by the fractionating flashing and regeneration of the laden scrubbing liquors used for physical scrubbing treatments. The use of such fractions is particularly advantageous because they contain hydrocarbons as well as mercaptans and HCN in high concentrations.

In accordance with the invention, the combustion is carried out with a slight excess of air, i.e. a slight excess of $O_2$. The excess of $O_2$ is adjusted by control means and in accordance with the invention is up to 0.2% by volume. The combustion causes all sulfur compounds to be burned to $SO_2$. Traces of $SO_2$, $H_2S$ and COS are left. $NH_3$ is converted to $N_2$ nitrogen oxides.

In the process according to the invention, the flue gas produced by the combustion is passed through waste heat-utilizing means or coolers, wherein the gas temperature is adjusted to 300°–450°, preferably 360°–400° C, and the gas is then passed through a bed of granular coke which has preferably a particle size of 5–20 mm. The coke consists preferably of petroleum of coke or low-temperature coke, which has been produced from peat, brown coal or hard coal by low-temperature coking. The following reactions take place on the coke:

$$O + C \rightarrow CO_2$$

$$2 SO_3 + C \rightarrow 2 SO_2 + CO_2$$

$$H_2S + 3/2 O_2 \rightarrow SO_2 + H_2O \text{ (catalytic)}$$

By these reactions, said constituents, which are undesirable for the further processing of the gas, are eliminated or converted into harmless substances. The gas now contains sulfur only as $SO_2$.

In accordance with the invention this gas, which is free from $O_2 SO_3$, is suitably cooled first to a temperature of 20°–80° and is then scrubbed with the aqueous solution of alkali salts of weak inorganic and/or organic acids to remove $SO_2$, which is to be recovered in concentrated form.

The alkali cations may consist of ammonium, sodium or potassium alone or in a mixture. The acid anions may consist of those of sulfurous acid, arsenious acid, boric acid, phosphoric acid, vanadic acid, phenols and the like. To ensure a high absorption capacity for $SO_2$, the aqueous solutions are used at the highest concentration which ensures that the saturation limited will not be exceeded at a temperature of 0° C. Depending on the nature of the compound used in the scrubbing solution, the $SO_2$ is combind therein to form alkali hydrogen sulfite, and the weak acid which is contained in the scrubbing solution and combined with the alkali metal is released, e.g., in accordance with the reaction equation:

$$NA_2HPO_4 + SO_2 + H_2O = NaH_2PO_4 + NaHSO_3$$

if $Na_2HPO_4$ is used as an active scrubbing agent.

The above reaction takes place in the reverse direction during the regeneration of the $SO_2$-laden scrubbing solution. The scrubbing solution may be regenerated by being directly heated with water vapor or by being indirectly heated with a heating gas or a hot exhaust gas.

Aliphatic amines, such as ethylene diamine, alkanolaines or aromatic amines, e.g. toluidine, xylidine, aniline and the like may also be used as scrubbing agents.

The scrubbing solution used to remove $SO_2$ from the gas is regenerated and recirculated. Depending on the degree to which the laden scrubbing solution is regenerated, the regeneration exhausted gas contains 100–150 ppm $SO_2$. The $SO_2$ which has been stripped from the laden scrubbing solution is concentrated and free from other gaseous constituents.

To eliminate water vapor, the $SO_2$ is cooled to normal temperature and is then processed to form sulfur. For this purpose, hydrogen or a hydrogen-containing gas is added, and the mixture is heated to a temperature of 200°–450° C, and is then caused to flow in contact with a sulfur-resisting hydrogenating catalyst, which contains metals of the 6th and/or 8th group(s) of the periodic system, preferably CO, Ni, Mo, and W, and on which the $SO_2$ is reduced at least in part to form $H_2S$ and in part to form sulfur.

This gas can be fed in known manner to a Claus process plant, if such plant is available. Alternatively, the gas can be fed to a specially adapted Claus process reactor in which the gas, to which $SO_2$ or $H_2S$ in a stoichiometric proportion has been added if required, is reacted to elemental sulfur in contact with a catalyst. This reactor contains a known catalyst consisting of activated alumina or the like. Granular activated carbon may also be used for this purpose. The gas leaving the Claus process reactor contains the resulting elemental sulfur in vapor form and also contains unreacted residual $H_2S$ and $SO_2$ and residual hydrogen, and is cooled to a temperature of about 130°–140° C to effect a condensation of the sulfur. The gas left after this condensation is admitted to the exhaust gases released by the regeneration of the laden absorbent solution and is burned and processed together therewith.

According to a further preferred feature of the invention, the sulfur dioxide stripped from the laden absorbent solution is reacted only in part with hydrogen to form hydrogen sulfide, part of said sulfur dioxide is added to the resulting hydrogen sulfide, and the mixture is subsequently reacted to form elemental sulfur.

Within the scope of the invention, hydrogen sulfide may be added to the sulfur dioxide which has been stripped from the laden absorbent solution, whereafter the mixture is reacted to form elemental sulfur.

In all cases it must be ensured that the conditions of the reaction represented by the equation:

$$2H_2S + SO_2 = 3 S + 2H_2O + Q$$

where Q is heat evolved, are maintained.

The process according to the invention will be described by way of example with reference to the accompanying flow scheme and enables a processing of ecologically unsatisfactory exhaust gases and a complete conversion of otherwise dangerous gaseous constituents with a simultaneous recovery of elemental sulfur.

BRIEF DESCRIPTION OF THE DRAWING

The above and other objects, features and advantages of this invention will become more readily apparent from the following description, reference being made to the accompanying drawing in which the sole FIGURE is a flow diagram illustrating the process as it applies to the specific example given hereinafter.

SPECIFIC DESCRIPTION

The drawing shows a combustion chamber 4 which has a burner 4a supplied with a combustion-promoting gas (fuel) through line 2, a combustion-sustaining gas (e.g. air) supplied through line 3 and exhaust gas containing sulfur compounds to be processed in accordance with the invention which is supplied through line 1. A line 29 also serves to recycle a portion of clean gas to the burner as a diluent.

The gaseous combustion products are delivered via line 5 to a reactor 6 packed with coke from which the gases pass through a waste heat recovery system represented diagrammatically at 8 and serving to cool the gases. An aftercooler 9, supplied with precooled combustion gases from the waste heat utilizer 8 via line 8a, brings the gases to the desired temperature before they enter the first scrubbing column 10. A gas 11 emerging from this scrubbing column can be discharged into the atmosphere since it contains only a small concentration of sulfur as the oxide. A pump 12 draws the scrubbing liquid from the sump of column 19 and sprays it into the head of a regenerating column 14, the sump of which is provided with a heater 15 capable of bringing the scrubbing liquid to a temperature which enables it to release the absorbed gages. The regenerated liquid is drawn from the sump of the column 14 by a pump 17 and passes through in heat exchanger 13 in which it preheats the liquid sprayed into the head of this column 14. Pump 17 delivers the regenerated scrubbing liquid to the head of column 10.

The desorbed gases are cooled at 19, passed through the heat exchanger 8 and supplied to a reactor 21 containing a reducing catalyst. The gases then pass through a condenser 22 for the sulfur which is collected at tank 30 and enters a Claus reactor in which sulfur is formed from the $H_2S$. Another condenser 25 again separates out sulfur and the gas, after passing through a particle separator 26 from which atomized or finely divided sulfur is recovered, is recycled via a blower 28 to the line 29 or the reactor 21. Line 24 can deliver $SO_2$ containing gas to the Claus reactor together with the $H_2S$ gas from the reactor 21 so that the Claus process reaction of $H_{2L}S$ and $SO_2$ can proceed in the usual manner.

EXAMPLE

Gaes produced by the pressure gasification of coal is subjected to a physical scrubbing under pressure and at low temperature. Methanol is used as a scrubbing agent and is flashed and regenerated to release a regeneration exhaust gas having the following composition:

| | |
|---|---|
| $H_2S$ | 0.47% by vol. |
| $CO_2$ | 98.27% by vol. |
| $CH_4$ | 0.48% by vol. |
| $C_2H_6$ | 0.69% by vol. |
| $C_3H_8$ | 0.09% by vol. |
| COS | 180 ppm |
| HCN | 206 ppm. |

Combustion-promoting gas is supplied through conduit 2 and preheated air is supplied through conduit 3 to this regeneration exhaust gas as the same is fed through conduit 1 to a combustion chamber 4, in which the gas is burned to form a gas having the following composition:

| | |
|---|---|
| $H_2O$ | 2.98% by vol. |
| $SO_2$ | 0.37% by vol. |
| $CO_2$ | 79.22% by vol. |
| $N_2$ | 17.35% by vol. |
| $O_2$ | 0.08% by vol. |
| $SO_3$ | 180 ppm |
| $NO_x$ | 57 ppm. |

This gas may be cooled, if desired, and is fed through conduit 5 into a reactor 6, which is packed with granular petroleum coke and in which, at a temperature of about $380+-400°$ C, the residual oxygen is reduced to form $CO_2$, the $SO_3$ is reduced to form $SO_2$, and nitrogen oxides are reduced to $N_2$. The resulting gas flows through conduit 7, a heat exchanger 8 and an aftercooler 9, and then enters a scrubbing column 10 and flows through the same from bottom to top. In said scrubbing column the gas is scrubbed at a temperature of 65° C with a counterflowing aqueous solution of $Na_2HPO_4$ and is thus freed from $SO_2$. The gas leaving the scrubbing column through conduit 11 contains less than 250 pm $SO_2$.

By a pump 12, the $SO_2$-laden scrubbing solution is withdrawn from the sump of the scrubbing column and is fed through a heat exchanger 13 to the top of a regenerating column 14. In the sump of column 14, the laden scrubbing solution is heated by a heating system 15 to the regeneration temperature and is thus caused to release the absorbed $SO_2$, which leaves the column through conduit 16. By means of a pump 17, the regenerated scrubbing solution is fed through a conduit 18 and the heat exchanger 13 to the top of the scrubbing column 10.

$SO_2$ leaves the regenerating column 14 through conduit 16 and flows through a cooler 19, in which water vapor is condensed and through the outlet of said cooler and conduit 20 and the heat exchanger 8 into a reactor 21, which is packed with reduction catalyst. Hydrogen or a hydrogen-containing gas is added from conduit 32 to the gas before it enters the reactor 21, in which at least part of the gas is reduced at a temperature of 200°–400° C to form $H_2S$ and elemental sulfur. When the resulting sulfur has been separated in a cooler 22, the gas consisting of $H_2S$, $SO_2$ and $H_2O$ enters a Claus process reactor 23, in which the gas is reacted in contact with an alumina catalyst to form elemental sulfur. The $SO_2$ required for this purpose is also removed through conduit 24 from the $SO_2$ main stream 16 and is added in stoichiometric proportions. The exhaust gas from the Claus process reactor is conducted through a cooler 25 and a separator 26, whereby the resulting sulfur is condensed, and the gas is then fed by a blower 28 through conduit 27 into the conduit 31 to cause the residual hydrogen to be processed.

The liquid sulfur which has been separated in the reactors 21 and 23 and in the coolers 22 and 25 flows into the collecting tank 30.

We claim:

1. A process for recovering elemental sulfur from a gas containing inorganic and/or organic sulfur compounds together with carbon dioxide and impurities which may include hydrogen cyanide and unsaturated hydrocarbon, said process comprising the steps of:
   a. combining said gas with a combustion promoter and burning same with a slight excess to produce a combustion gas stream;
   b. contacting said combustion gas stream with coke at a temperature of 300° to 450° C to remove residual oxygen, sulfur trioxide and nitrogen oxides from said combustion gas stream and forming a prepurified gas stream;
   c. thereafter cooling said prepurified gas stream to a temperature of 20° to 80° C and scrubbing same with an aqueous solution of an absorbent selelected from the group which consists of alkali salts of weak inorganic acids and organic acids, and amines, thereby absorbing in said solution sulfur dioxide from the prepurified gas stream;
   d. heating said absorbent and stripping sulfur dioxide from said absorbent and forming a hot $SO_2$-containing gas stream;
   e. cooling the $SO_2$-containing gas stream and removing water by condensation therefrom;
   f. adding hydrogen to said $SO_2$-containing gas stream and following step (e) and reacting the resulting mixture at a temperature of 200° to 450° C on a catalyst selected from the group which consists of oxides of cobalt, oxides of nickel, oxides of molybdenum and oxides of tungsten to reduce the $SO_2$ and form a sulfur and $H_2S$-containing gas stream;
   g. separating from the sulfur and $H_2S$ containing gas stream resulting in step (f) by cooling elemental sulfur and recovering same;
   h. admixing with the hydrogen sulfide containing gas from which elemental sulfur has been removed in step (g) an amount of $SO_2$ stoichiomtrically sufficient to react with the $H_2S$ thereof and passing the resulting mixture at a temperature of 200° to 300° C over an alumina or activated carbon catalyst to form the gas stream containing elemental sulfur;

i. separating elemental sulfur from the gas stream formed in step (h) by cooling and recovering the elemental sulfur thus separated; and j. recycling the gas remaining after step (i) at least in part to a preceding step.

2. The process defined in claim 1 wherein the contact of the gas stream and the coke in step (b) is carried out at a temperature of 360° to 400° C.

3. The process defined in claim 1 wherein said coke is petroleum coke or low temperature coke produced from peat or brown coal or hard coal.

4. The process defined in claim 1 wherein said coke has a particle size of from 5 to 20 mm.

5. The process defined in claim 1 wherein only part of the sulfur dioxide is reacted in step (f) in hydrogen to form hydrogen sulfide, the remainder being unreacted and the mixture of hydrogen sulfide and sulfide dioxide is subsequently reacted to form elemental sulfur.

6. The process defined in claim 1 wherein a sulfur dioxide containing gas stream from step (d) or step (f) is combined with hydrogen sulfide and the resulting mixture is reacted to produce elemental sulfur.

* * * * *